United States Patent
Ammann et al.

[11] 3,836,866
[45] Sept. 17, 1974

[54] Q-SWITCHED LASER MODE SELECTION SYSTEM

[75] Inventors: Eugene O. Ammann, Menlo Park; Joe Michael Yarborough, Santa Clara, both of Calif.

[73] Assignee: GTE Sylvania Incorporated, Mountain View, Calif.

[22] Filed: Jan. 29, 1973

[21] Appl. No.: 327,691

[52] U.S. Cl. ......................... 331/94.5 Q, 33/94.5 M
[51] Int. Cl. ............................................. H01s 3/11
[58] Field of Search .................................. 331/94.5

[56] References Cited
OTHER PUBLICATIONS

Hook et al., Proceedings of the IEEE, December, 1966, pp. 1954–1955 TK 5700 17.
Thomas et al., IEEE Journal of Quantum Electronics, Vol. QE-2, No. 9, September, 1966, pp. 617–623. QC 447 12.

*Primary Examiner*—Ronald L. Wibert
*Assistant Examiner*—Robert J. Webster
*Attorney, Agent, or Firm*—John F. Lawler; Norman J. O'Malley; Elmer J. Nealon

[57] ABSTRACT

The subject of this invention is a mode selection technique which applies specifically to continuously-pumped, repetitively Q-switched lasers. When the gain of such a laser becomes slightly greater than the hold-off loss of the Q-switch, there is a premature output consisting of a series of relaxation oscillation pulses (or spikes). In the technique of this invention, the presence of the first such relaxation oscillation pulse is detected by a detector external to the laser cavity and consequently used to trigger the opening of the Q-switch. It is important that the Q-switch be opened shortly after the occurrence of the first relaxation oscillation pulse, and in particular, before the occurrence of the second such pulse. The resulting output pulse from the laser has significantly fewer longitudinal and transverse modes than obtained with normal operation of a repetitively Q-switched laser. Since the opening of the Q-switch is triggered by the onset of relaxation oscillations, pulse-to-pulse variations caused by laser mirror vibrations, pump-lamp intensity fluctuations, etc. have no effect on the accuracy of mode control. This mode control is achieved without otherwise affecting the normal Q-switced operation of the lasers; no additional components are required inside the laser other than those normally used in Q-switched lasers.

5 Claims, 6 Drawing Figures

Q-SWITCHED LASER MODE SELECTION SYSTEM

BACKGROUND OF THE INVENTION

The invention herein described was made in the course of a contract with the Department of the Air Force.

This invention relates to improvements in continuously pumped repetitively Q-switched lasers.

Continuously pumped repetitively Q-switched lasers are useful in producing bursts or pulses having extremely high energy content. One of the problems with such Q-switched lasers is the lack of a high degree of mode purity, that is, the output of the laser contains a large number of longitudinal and transverse modes which are at slightly different frequencies and have randomly varying amplitudes and phases.

Workers have observed in the past that lasers with slowly-opening Q-switches demonstrate better mode purity than lasers with rapidly-opening Q-switches. A typical laser setup on which this observation has been made consists of a flash-pumped laser which utilizes a bleachable-dye Q-switch. Sooy in an article entitled "The Natural Selection of Modes in a Passive Q-Switched Laser" (Applied Physics Letters, volume 7, page 36, July 15, 1965) has offered an explanation for the mode-control properties of such a setup by stating that mode selection may be related to the laser mode buildup rates. Sooy shows that the differentiation between two modes, in terms of loss or gain, required to suppress the weaker one is inversely proportional to the number of loop transits the signal makes while building up out of the noise. In lasers with slowly-opening Q-switches, the signal makes many more transits than it does in rapidly Q-switched lasers. A difficulty with the bleachable-dye embodiment for a slowly opening Q-switch is that it is limited to flash-pumped lasers and further, the precise timing of the opening of the bleachable-dye Q-switch cannot be controlled because its operation is laser power dependent.

Another technique which uses a slowly-opened Faraday-rotator Q-switch in a laser for improving mode purity is described in an article entitled "Laser Mode Selection With Slowly-Opened Q-Switches," IEEE Journal of Quantum Electronics, volume QE-5, page 489 (October 1969). While some improvement in mode control is reported as a result of this technique, it too suffers from the disadvantage of being applicable only to flash-pumped lasers (lasers operating at slow pulse repetition rates).

In accordance with this invention, improved longitudinal and transverse mode control is provided by utilizing a Q-switch having insufficient loss to hold off the laser indefinitely. At the instant that the laser gain exceeds the Q-switch loss and a modest relaxation-oscillation output occurs, the Q-switch is opened and a laser pulse containing fewer longitudinal and transverse modes than usual is emitted. This onset of oscillation can be thought of as a seed pulse for the resulting Q-switched pulse. This seed pulse has made many transits through the laser because the Q-switch has been closed during this time, and thus experiences mode control.

Two different methods for determining when to open the Q-switch are possible. If the time required for the laser pulse to exceed the Q-switch loss is exactly the same from pulse to pulse, a fixed repetition-rate pulser can be used to open the Q-switch. In general, however, there are pulse to pulse variations in the buildup time due to laser mirror vibrations, pump lamp intensity fluctuations, etc. In accordance with this invention, we circumvent the instability problem by detecting the onset of relaxation oscillations and using this to trigger the opening of the Q-switch. This triggering is accomplished with a detector disposed wholly externally of the cavity and response to the first relaxation oscillation pulse generated within the cavity to trigger the Q-switch open for generating the output pulse. Improved mode control is thus achieved without adversely affecting laser operation.

DESCRIPTION OF PREFERRED EMBODIMENT

Figure 1:
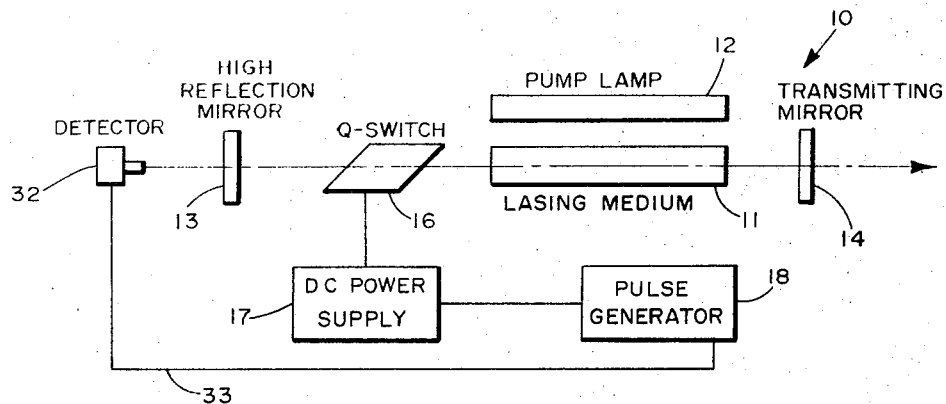
FIG. 1 is a schematic block diagram of a Q-switched laser embodying the invention.

Referring now to the drawings, a laser 10 of the type with which the invention may be practiced is shown in FIG. 1 and comprises lasing medium 11, a pump lamp 12, a high reflection mirror 13 and a transmitting mirror 14 through which the output from the laser is derived as indicated by the arrow. The operation of the laser is controlled by a Q-switch element 16 in the laser cavity and energized by a d-c power supply 17 in response to a normally repetitive output from a pulse generator 18. When switch element 16 is in the closed state as determined by the bias voltage applied by power supply 17, a loss is induced in the cavity in excess of the laser gain so that no output is derived from the transmitting mirror 14. When in response to the output from pulse generator 18, the bias voltage applied to switch element 16 is suddenly changed so that the Q-switch loss falls below the laser gain, the energy stored in the lasing medium through the continuously operating pump lamp is released in one giant pulse which appears as the output of the laser. By repetitively operating the Q-switch in this manner, a series of giant output pulses are produced.

By way of example, the lasing medium may be a solid bar of neodymium yttrium aluminate ($Nd:YAlO_3$) continuously pumped by a pair of tungsten-halogen lamps. The laser cavity may be formed by two flat mirrors one of which is highly reflecting at $1.08\mu$ while the other has a 96 percent reflectivity. The switch element 16 may be either acousto-optic or electro-optic, the latter being shown in FIG. 1. Element 16 typically is made of lithium niobate.

Figure 2:
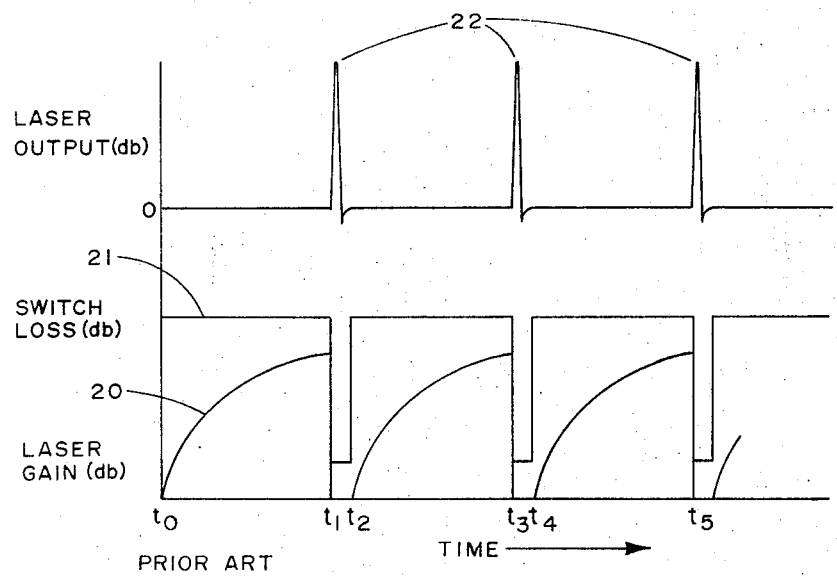
FIG. 2 is a timing diagram showing the switching operation of a prior art device.

The foregoing Q-switched laser is well known in the prior art and does not per se constitute this invention. The operation of this Q-switched laser is shown in FIG. 2 in which the abscissa is time and in which curve 20 represents the gain of the laser, curve 21 the switch loss relative to the gain of the laser and pulses 22 the output of the laser. Between the times $t_0$ and $t_1$, the gain of the laser increases as a result of the energy pumping by lamp 12 while the switch in the closed state produces a loss which exceeds the laser gain. During this period there is no output from the laser. At time $t_1$, the Q-switch is quickly opened by an output trigger signal from pulse generator 18 causing the Q-switch to suddenly open so that its loss rapidly drops below the laser gain; this results in the generation of a giant output pulse 22 as the gain of the laser drops to a minimum. At time $t_2$ the trigger output of generator 18 goes to zero, Q-switch 16 again closes and produces a relatively high loss and, between times $t_2$ and $t_3$, the gain of the laser again increases until, at time $t_3$, the switch is again suddenly opened to produce another output pulse. This operation is repeated for the production of the train of pulses 22.

Figure 3:
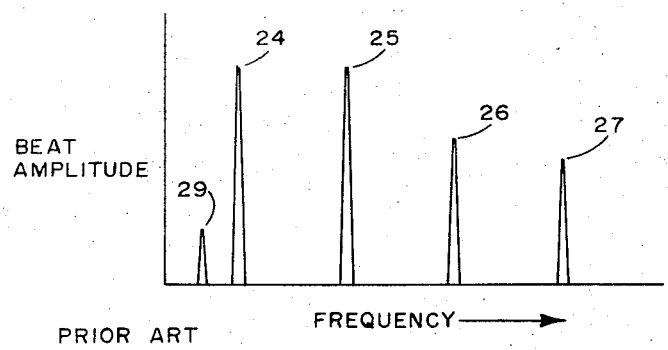
FIG. 3 is a schematic diagram showing radio frequency beat spectra for prior art lasers switched in accordance with FIG. 2.

The spectral purity of pulses 22 is illustrated in FIG. 3 which shows microwave beats obtained from a square law detector responsive to the output of the pulsed laser and producing an output which is displayed on an RF spectrum analyzer. Pulses 24, 25, 26 and 27 represent the first four beats between longitudinal modes which are present in the conventional repetitively Q-switched laser described above. These pulses are sometimes called "c/2L" beats, where c is the velocity of light and L is the optical path length between mirrors defining the laser cavity. The smaller beat pulse 29 illustrates a higher-order transverse mode. The presence of these several modes in the laser output pulse limits the utility of the laser because the various modes act independently and thus degrade the coherence (or purity) of the laser.

In accordance with this invention, provision is made to cause the Q-switch to open precisely at a predetermined time after the first pulse of a relaxation oscillation from the laser occurs. More specifically, we have found that mode control is effective if the Q-switch is opened anywhere from zero to 5 microseconds after the first pulse of the relaxation oscillation. This is achieved by utilizing the first relaxation-oscillation spike or pulse to trigger pulse generator 18 so that the apparatus is self-triggering. In order to achieve this objective without adversely affecting laser operation, an optical detector 32, FIG. 1, is located externally of high reflection mirror 13 in alignment with the laser beam. Detector 32 is responsive to laser beam energy which leaks through mirror 13 to produce an output signal on line 33 which is applied to pulse generator 18 to trigger it into operation. Detector 32 may be a conventional type such as a PIN photodiode, and being located adjacent the outside of high reflectivity mirror has no adverse effect on the operation of the laser.

Figure 4:
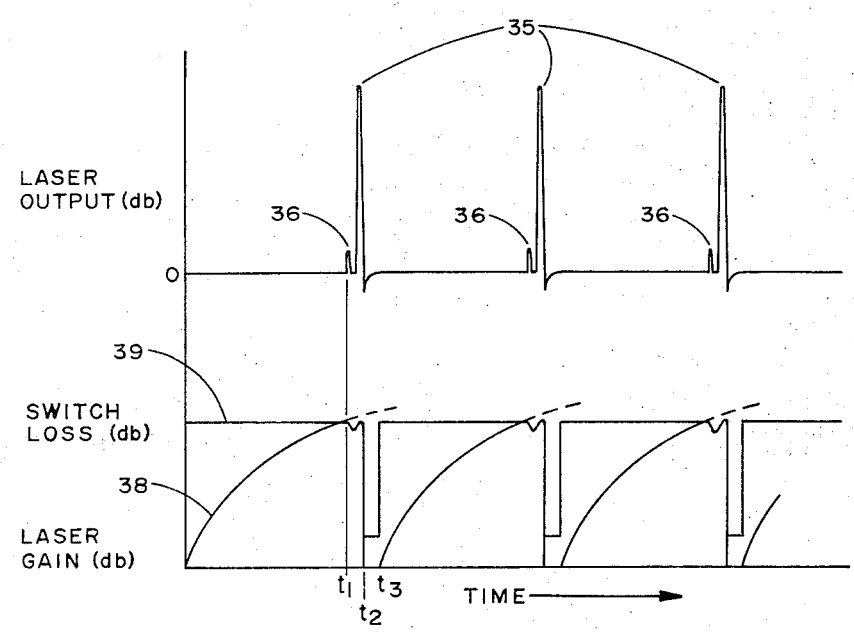
FIG. 4 is a timing diagram similar to FIG. 2 illustrating the operation of this invention.
Figure 5:
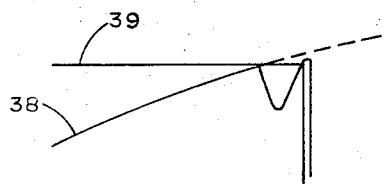
FIG. 5 is a greatly enlarged view of a portion of FIG. 4 showing the switch loss and laser gain relationship at the time of generation of the output pulse.

The operation of the laser in accordance with the invention is shown in FIG. 4 in which pulses 35 represent the high energy output pulses of the laser, each pulse being preceded by relaxation-oscillation seed pulse (or spike) 36 which is greatly exaggerated in size for purposes of explanation. As in the foregoing description, curve 38 indicates the increase in laser gain due to the pumping action of the lamp and curve 39 illustrates the Q-switch loss characteristic. At time $t_1$ the laser gain curve reaches or slightly exceeds the switch loss curve causing the laser to begin to generate relaxation oscillations; the gain of the laser drops slightly as shown in FIG. 5 and then builds up again in response to the continuous pumping of the pump lamp. During this first increment of time, the first relaxation-oscillation spike 36 is thereby produced. Before another such spike can be produced by the laser, pulse generator 18 is triggered by the output from optical detector 32 which senses and detects this spike 36. This occurs at time $t_2$ approximately 5 microseconds after time $t_1$ and causes the Q-switch to open suddenly and to produce the giant pulse 35 at the output of the laser. At the same time the switch loss and laser gain decrease rapidly and at time $t_3$, in the absence of an output from pulse generator 18, the switch again closes and the laser gain begins to increase to repeat the foregoing operation and produce another seeded output pulse 35.

Figure 6:
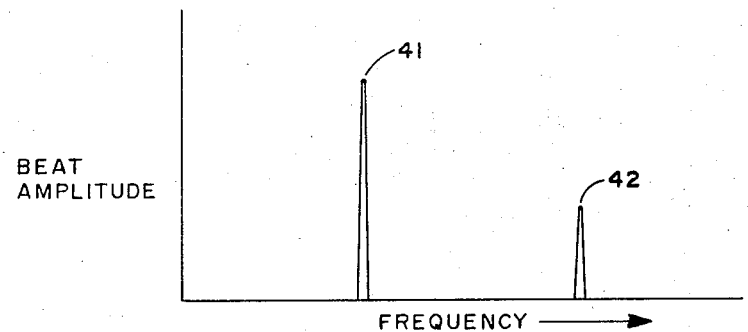
FIG. 6 is a radio frequency beat spectra diagram similar to FIG. 3 showing the improved performance of a laser switched in accordance with this invention.

The spectral purity of output pulses 35 produced in accordance with this invention is shown in FIG. 6 wherein the beats have been reduced to the two shown at 41 and 42. Tests have indicated that, in addition to substantial reduction in the longtiudinal modes present in the output pulses of the laser, there is also a reduction of transverse mode amplitudes.

The mode-control technique described above is of use whenever a repetitively Q-switched laser is employed. An advantageous feature of the invention is its simplicity and the fact that no additional components are required inside the laser cavity. Accordingly there is neither an addition of complexity nor a decrease in laser output power through the practice of the invention. While the technique does not by itself produce single-frequency operation, it reduces the number of both transverse and longitudinal modes present. While mode control operation using an electro-optic Q-switch has been described, an acousto-optic switch may also be employed with similar results.

What is claimed is:

1. The method of reducing the number of modes oscillating in a continuously pumped repetitively Q-switched laser which characteristically produces relaxation oscillations when the gain of the laser becomes slightly greater than the hold-off loss of the Q-switch, consisting of the steps of allowing the laser to produce relaxation oscillations through use of a Q-switch having a hold-off loss greater than the laser gain but insufficient to hold off laser oscillation indefinitely;

detecting the first pulse of said relaxation oscillations, and immediately opening the Q-switch for establishing a high Q condition in response to the detection of said first relaxation oscillation pulse to decrease the loss introduced by the Q-switch to below the laser gain and to cause a giant output pulse.

2. The method according to claim 1 in which said Q-switch is opened prior to occurrence of the second pulse of relaxation oscillations.

3. The method according to claim 1 which includes opening said switch within 5 microseconds after the beginning of said relaxation oscillations.

4. In a continuously-pumped, repetitively Q-switched laser having a resonant cavity defined by an optical axis and a high reflection mirror and a transmitting mirror, an active Q-switching transducer traversing said axis within said cavity, and means for biasing said transducer between closed and open states to produce an actual hold off loss which is greater than the laser gain but which is insufficient to hold off laser oscillation indefinitely so that relaxation oscillation pulses are eventually generated, the improvement of means for producing a trigger signal in response to generation of the initial relaxation oscillation pulse by said laser with said insufficient hold off loss, and means for applying said trigger signal to said biasing means for suddenly opening said transducer whereby the laser produces a giant output pulse.

5. The laser according to claim 4 in which said producing means comprises an optical detector adjacent to said high reflection mirror externally of said cavity and producing an output in response to said first relaxation-oscillation pulse, and a pulse generator responsive to the output of said detector for changing the operating state of said transducer from closed to open.

* * * * *